United States Patent
Zhang

(10) Patent No.: US 8,867,606 B2
(45) Date of Patent: Oct. 21, 2014

(54) MULTI-CORE IMAGE ENCODING PROCESSING DEVICE AND IMAGE FILTERING METHOD THEREOF

(75) Inventor: Lianping Zhang, Guangdong Province (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 518 days.

(21) Appl. No.: 13/257,665

(22) PCT Filed: May 25, 2010

(86) PCT No.: PCT/CN2010/073232
§ 371 (c)(1),
(2), (4) Date: Dec. 17, 2011

(87) PCT Pub. No.: WO2010/145424
PCT Pub. Date: Dec. 23, 2010

(65) Prior Publication Data
US 2012/0195382 A1    Aug. 2, 2012

(30) Foreign Application Priority Data

Jun. 18, 2009  (CN) .......................... 2009 1 0150023

(51) Int. Cl.
*H04N 7/50*        (2006.01)
*H04N 19/43*      (2014.01)
*H04N 19/82*      (2014.01)
*H04N 7/26*        (2006.01)

(52) U.S. Cl.
CPC ....... *H04N 7/26739* (2013.01); *H04N 7/26382* (2013.01)
USPC ........................................................ 375/240

(58) Field of Classification Search
USPC .................................................... 375/240.29
See application file for complete search history.

(56) References Cited

U.S. PATENT DOCUMENTS

| 5,974,197 | A  | * | 10/1999 | Lee et al. ...................... 382/268 |
| 6,665,346 | B1 | * | 12/2003 | Lee et al. ................. 375/240.29 |
| 7,251,276 | B2 | * | 7/2007  | Lee et al. ................. 375/240.03 |

(Continued)

FOREIGN PATENT DOCUMENTS

| CN | 101252691 A | 8/2008 |
| CN | 101256668 A | 9/2008 |

(Continued)

OTHER PUBLICATIONS

International Search Report for PCT/CN2010/073232 dated Aug. 19, 2010.

*Primary Examiner* — Sath V Perungavoor
*Assistant Examiner* — Howard D Brown, Jr.
(74) *Attorney, Agent, or Firm* — Ling Wu; Stephen Yang; Ling and Yang Intellectual Property

(57) ABSTRACT

An embodiment of the present invention discloses a method for performing image filtering by a multi-core image encoding device, comprising: a first digital signal processing (DSP) chip performing loop filtering on the image encoded by itself; and the latter digital signal processing (DSP) chip in any two adjacent DSP chips performing loop filtering on all horizontal boundaries except the highest horizontal boundary and all vertical boundaries of the first row of macro blocks in the image encoded by itself. An embodiment of the present invention further discloses a multi-core image encoding device. Using the method for performing image filtering of the present invention, utilization of DSP resources in the multi-core image encoding device can be improved effectively.

16 Claims, 8 Drawing Sheets

(56) References Cited

U.S. PATENT DOCUMENTS

| | | | |
|---|---|---|---|
| 8,243,800 B2* | 8/2012 | Hong | 375/240.12 |
| 8,249,174 B2* | 8/2012 | Hong | 375/240.29 |
| 8,265,144 B2* | 9/2012 | Christoffersen et al. | 375/240.1 |
| 8,526,509 B2* | 9/2013 | Norkin et al. | 375/240.29 |
| 2005/0201633 A1* | 9/2005 | Moon et al. | 382/268 |
| 2008/0159386 A1* | 7/2008 | Lee et al. | 375/240.03 |
| 2009/0002379 A1* | 1/2009 | Baeza et al. | 345/522 |
| 2009/0080517 A1* | 3/2009 | Ko et al. | 375/240.03 |

FOREIGN PATENT DOCUMENTS

| | | | |
|---|---|---|---|
| CN | 101321290 A * | 12/2008 | H04N 7/26 |
| CN | 101321290 A | 12/2008 | |
| CN | 101583041 A | 11/2009 | |

* cited by examiner

MULTI-CORE IMAGE ENCODING PROCESSING DEVICE AND IMAGE FILTERING METHOD THEREOF

TECHNICAL FIELD

The present invention relates to the field of digital image processing, and more particularly, to a method for performing image filtering by a multi-core image encoding device and a multi-core image encoding device.

TECHNICAL BACKGROUND

At present, high definition video has become a hot spot in market. Compared with standard definition, advantages of high definition images are obvious. However, the problem that follows is that consumption of processing resources brought by the high definition images increases exponentially compared with the standard definition.

In addition, the image encoding ability of the currently strongest single chip core processor is very limited. When the processing ability of the single chip core processors is insufficient to finish tasks of the high definition images independently, a lot of manufacturers use multi-core image encoding devices to complete high definition image encoding. A plurality of digital signal processing (DSP) chips are included in a multi-core image encoding device and one image frame is divided into a plurality of portions, each DSP encoding one of the portions respectively.

For the H.264 protocol, a process of encoding a image frame mainly comprises prediction (including intra-frame prediction and inter-frame prediction), discrete cosine transform (DCT), quantification, entropy coding, inverse quantification, inverse DCT and loop filtering. The loop filtered image is used as a prediction image of a subsequent image. All these, except the loop filtering, are performed inside slices which are independent of each other. For example, a reference value required for the intra-frame prediction will not exceed boundaries of the slices, thus each slice can perform the intra prediction independently. When the image is divided into two halves, two DSP chips can process them independently, because the required data is inside the current slice, that is, there is no second DSP which needs to wait until the first chip has finished the processing and then begin the processing. One slice includes one or more macro blocks.

However, a loop filtering process defined in the H.264 is an exception, where filtering is performed on the whole frame and strictly according to the grating scan order of macro blocks. A necessary condition to perform filtering for a certain specific macro block is that filtering for a left macro block and an upper macro block adjacent to the current block has been completed. As shown in FIG. 1, loop filtering of the macro blocks is performed in the up-to-down and left-to-right order.

Loop filtering defined in the H.264 is performed by taking a macro block as a unit. Inside a macro block, filtering for vertical boundaries is performed first, and then filtering for horizontal boundaries is performed. The filtering for the vertical boundaries is performed in the left-to-right order, and the filtering for the horizontal boundaries is performed in the up-to-down order. For example, as shown in FIG. 2, one macro block includes four vertical boundaries, a, b, c, and d, and four horizontal boundaries, e, f, g, h. When loop filtering is performed on the macro block, the filtering for the vertical boundaries is performed in the order of a-to-b-to-c-to-d, and the filtering for the horizontal boundaries is performed in the order of e-to-f-to-g-to-h.

When a dual chip core processor is used for encoding, in order to achieve load balance of the two DSP chips, generally an image frame to be encoded is horizontally divided into the upper half and lower half. Because horizontal movement is typically more violent than vertical movement of video, dividing the image horizontally into the upper half and lower half can better comply with this characteristic of the image such that the divided image has good visual effect. After the image frame is divided into the upper half and lower half, one DSP chip processes half of the image, for example, DSP0 processes the upper half of the image, and DSP1 processes the lower half of the image. According to the H.264 protocol, upon the filtering for the image, DSP1 cannot perform the filtering independently, and it needs to wait until DSP0 has completed the filtering for the upper half of the image and then begin to perform the filtering on the lower half of the image which the DSP1 is in charge of, such that filtering can be performed in series between the DSPs, which is a great waste for valuable DSP resources.

SUMMARY OF THE INVENTION

Embodiments of the present invention provides a method for performing image filtering by a multi-core image encoding device and a multi-core image encoding device, so as to improve utilization of DSP resources in the multi-core image encoding device.

One embodiment of the present invention provides a method for performing image filtering by a multi-core image encoding device comprising:

a first digital signal processing (DSP) chip performing loop filtering on the image encoded by itself; and the latter digital signal processing (DSP) chip in any two adjacent DSP chips performing loop filtering on all horizontal boundaries except the highest horizontal boundary and all vertical boundaries of the first row of macro blocks in the image encoded by itself.

One embodiment of the present invention provides a method for performing image filtering by a multi-core image encoding device comprising:

the former digital signal processing (DSP) chip in any two adjacent DSP chips performing loop filtering on all horizontal boundaries except the highest horizontal boundary and all vertical boundaries of the first row of macro blocks of the last slice in the image encoded by itself; and the last DSP chip performing loop filtering on the image encoded by itself.

One embodiment of the present invention provides a multi-core image encoding device comprising a former digital signal processing (DSP) chip and a latter DSP chip, the former DSP chip and the latter DSP chip being any two adjacent DSP chips;

The latter DSP chip is configured to perform loop filtering on all horizontal boundaries except the highest horizontal boundary and all vertical boundaries of the first row of macro blocks in the image encoded by itself.

One embodiment of the present invention provides a multi-core image encoding device comprising a latter digital signal processing (DSP) chip and a former DSP chip, the latter DSP chip and the former DSP chip being any two adjacent DSP chips;

The former DSP chip is configured to perform loop filtering on all horizontal boundaries except the highest horizontal boundary and all vertical boundaries of the first row of macro blocks of the last slice in its own encode image.

In the present invention, two or more DSP chips in the multi-core image encoding device perform loop filtering on their own encoded images concurrently. In addition, for any two adjacent DSP chips, the latter one does not perform filtering on the highest horizontal boundary of the first row of macro blocks in the image when performing loop filtering for the image, or the former one does not perform filtering on the highest horizontal boundary of the first row of macro blocks of the last slice in the image when performing loop filtering for the image, such that a certain DSP chip can begin to perform loop filtering without waiting until the former DSP chip adjacent to the chip has completed loop filtering, and a plurality of DSP chips can further perform loop filtering concurrently, thereby improving effectively utilization of DSP resources in the multi-core image encoding device.

PREFERRED EMBODIMENTS OF THE INVENTION

In order to improve utilization of DSP resources in a multi-core image encoding device, a embodiment of the present invention provides a method for performing image filtering by the multi-core image encoding device. In the method, N DSP chips in the multi-core image encoding device perform loop filtering on their own encoded images concurrently. For any two adjacent DSP chips among the N DSP chips, the latter one does not perform filtering on the highest horizontal boundary of the first row of macro blocks in the image when performing loop filtering for the image, that is, the latter DSP chip performs loop filtering on other boundaries except the highest horizontal boundary of the first row of macro blocks when performing loop filtering on the first row of macro blocks in the image encoded by this DSP chip.

Since the $M^{th}$ DSP chip does not perform loop filtering on the highest horizontal boundary of the first row of macro blocks in the image, i.e., it does not perform loop filtering on horizontal boundaries of the first slice in the image encoded by the $M^{th}$ DSP chip, the $M^{th}$ DSP chip may begin loop filtering without waiting until the former DSP chip adjacent to the chip has completed the loop filtering, and the $M^{th}$ DSP chip and the former DSP chip adjacent to this chip can perform loop filtering concurrently.

The above method will be described below in conjunction with particular embodiments.

The First Embodiment

Figure 3A:
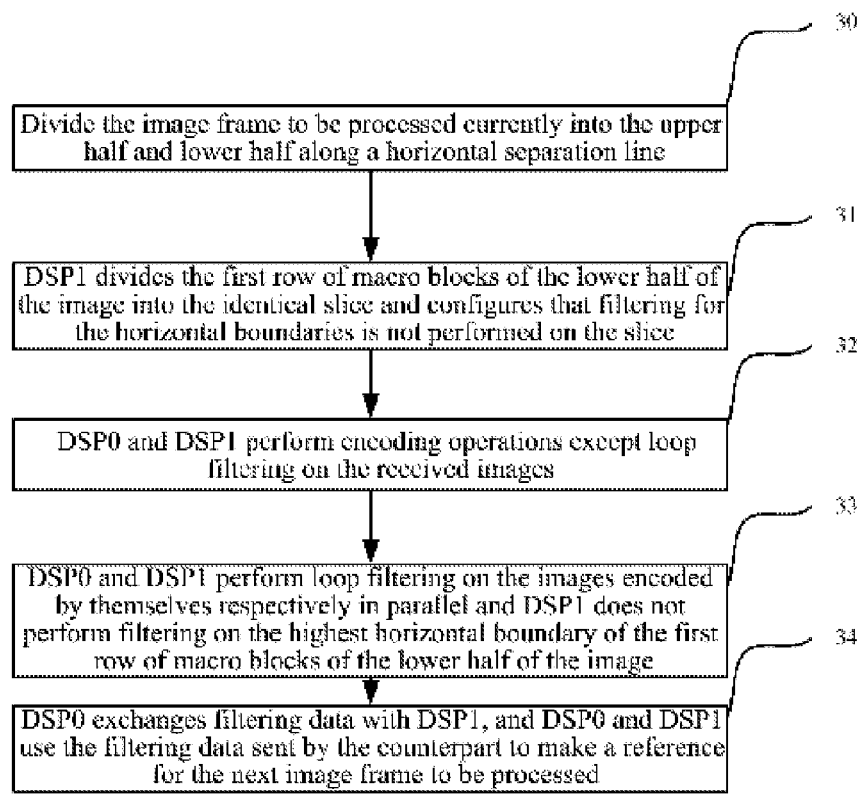
FIG. 3A is a flow chart of a method in accordance with the first embodiment of the present invention.

In this embodiment, a multi-core image encoding device comprises 2 DSP chips, DSP0 and DSP1. DSP0 processes the upper half of an image frame to be processed, and DSP1 processes the lower half of the image frame to be processed. DSP0 and DSP1 perform loop filtering for the image concurrently. As shown in FIG. 3A, a process of specific implementation will be described below.

Figure 3B:
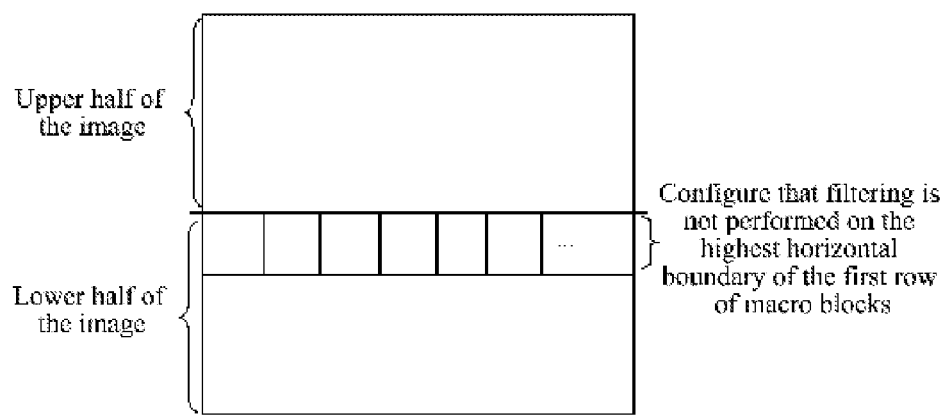
FIG. 3B is a schematic diagram of image division in accordance with the first embodiment of the present invention.

Step 30: the image frame to be processed currently is divided into the upper half and lower half along a horizontal separation line, as shown in FIG. 3B, the upper half of the image is sent to DSP0 for encoding, and the lower half of the image is sent to DSP1 for encoding.

Step 31: DSP1 divides the first row of macro blocks of the lower half of the received image into the identical slice and stores configuration information that filtering for horizontal boundaries is not performed on the slice, as shown in FIG. 3B.

Figure 1:
FIG. 1 is a schematic diagram of an order of macro blocks performing loop filtering in the prior art.

In this step, the filtering for the horizontal boundaries being not performed on the slice means that the filtering is not performed on the highest horizontal boundary of the first row of macro blocks of the slice. As shown in FIG. 1, for a macro block, a boundary e is the highest horizontal boundary of the macro block, meanwhile, it is also a horizontal boundary of the slice where the macro block is located. The filtering is not performed on the boundary e, and the filtering is still performed on other boundaries (e.g., f, g, h, b, c, d), based on the configuration information. Thus, the present invention affects only the boundary e and not other horizontal boundaries and vertical boundaries, the naked eye does not perceive decrease of the quality of the image.

The purpose of configuring filtering for the highest horizontal boundary of the first row of macro blocks in the lower half of the image to be unperformed will be described now. Because loop filtering for the lower half of the image begins from the first row of macro blocks, and in the prior art, filtering for the first row of macro blocks in the lower half of the image does not begin until loop filtering for the lower half of the image has been completed. In the present invention, after the filtering for the highest horizontal boundary of the first row of macro blocks in the lower half of the image is configured to be unperformed, filtering for the first row of macro blocks can begin to be performed without waiting until the loop filtering for the upper half of the image is completed, so as to be performed concurrently with loop filtering for the upper half of the image.

Step 32: DSP0 and DSP1 perform encoding operations except loop filtering, including intra-frame prediction and inter-frame prediction, DCT, quantification, entropy coding, inverse quantification, inverse DCT, on the received image.

Step 33: after DSP0 and DSP1 finish the encoding operations, they perform loop filtering on the images encoded by themselves in parallel. DSP1 does not perform filtering on the highest horizontal boundary of the first row of macro blocks in the image encoded by itself when performing loop filtering on the image.

Figure 2:
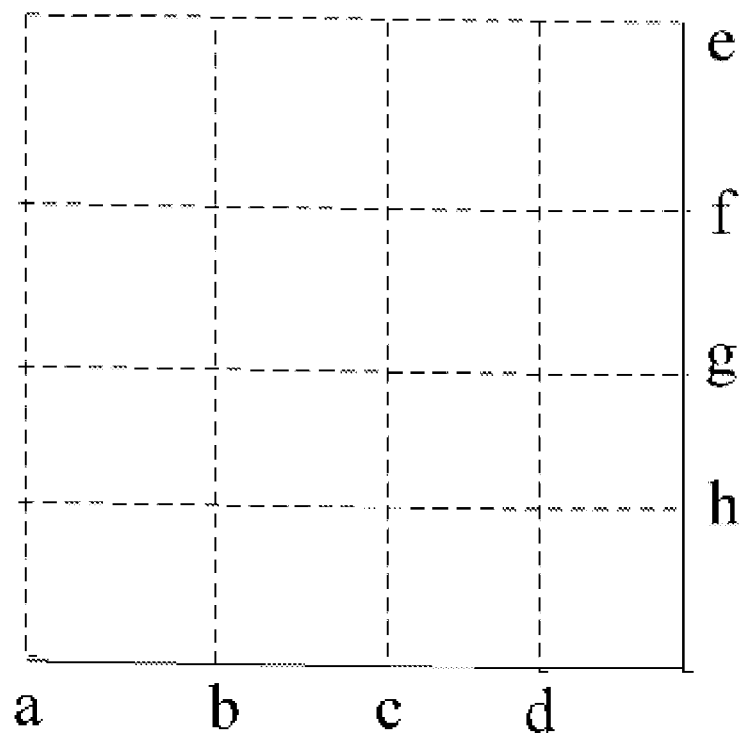
FIG. 2 is a schematic diagram of boundaries of macro blocks in the prior art.

In this step, DSP1 may perform filtering on the first row of macro blocks by reading the configuration information stored in the step 31 and performing loop filtering in turn on all the other horizontal boundaries except the highest horizontal boundary and all the vertical boundaries of the first row of macro blocks based on the configuration information. As shown in FIG. 2, the order of filtering for the boundaries of the first row of macro blocks is a, b, c, d, f, g, h.

There may be two cases where DSP0 and DSP1 perform loop filtering concurrently.

In the first case, DSP0 and DSP1 begin to perform loop filtering on the images encoded by themselves at the same time, i.e., DSP0 and DSP1 perform loop filtering completely concurrently.

In the second case, one of DSP0 and DSP1 begins to perform loop filtering on the image encoded by itself before the other DSP has completed loop filtering, i.e., DSP0 and DSP1 perform loop filtering partially concurrently.

DSP0 and DSP1 performing loop filtering concurrently saves the time for DSP1 to wait for loop filtering by DSP0, thereby greatly improving encoding efficiency of the processor.

Step 34: DSP0 exchanges filtering data with DSP1, and DSP0 and DSP1 use the filtering data sent by the counterpart to make a reference for the next image frame to be processed.

In this step, DSP1 sends filtering data of a set row of the loop filtered image to DSP0, for example, it sends filtering data of the first slice of the loop filtered image to DSP0; and DSP0 sends filtering data of a set row of the loop filtered image to DSP1, for example, it sends filtering data of the last slice of the loop filtered image to DSP1.

The Second Embodiment

Figure 4A:
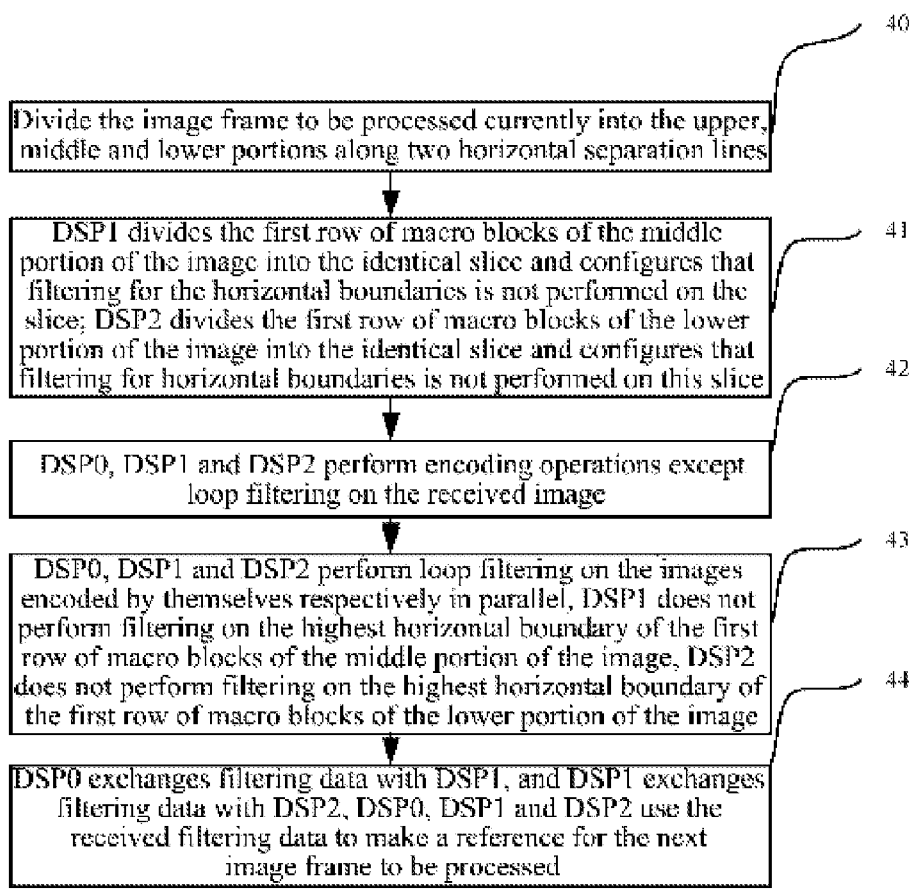
FIG. 4A is a flow chart of a method in accordance with the second embodiment of the present invention.

In this embodiment, a multi-core image encoding device comprises 3 DSP chips, DSP0, DSP1 and DSP2. DSP0 processes the upper portion of an image frame to be processed, DSP1 processes the middle portion of the image frame to be processed, and DSP2 processes the lower portion of the image frame to be processed. DSP0, DSP1 and DSP2 perform loop filtering for the image concurrently. As shown in FIG. 4A, a flow of specific implementation will be described below.

Figure 4B:
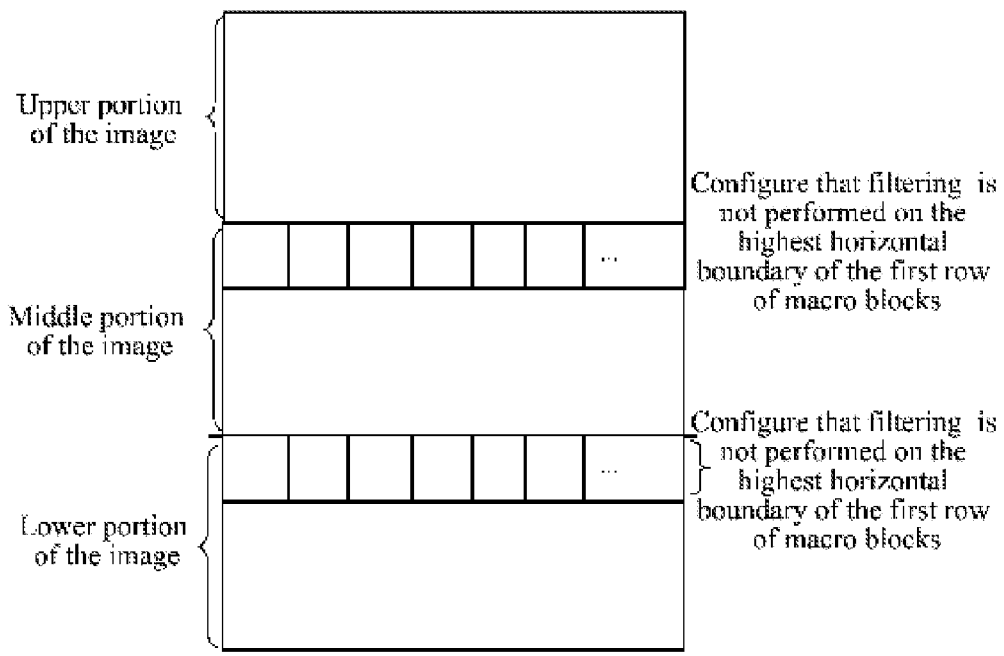
FIG. 4B is a schematic diagram of image division in accordance with the second embodiment of the present invention.

Step 40: the image frame to be processed currently is divided into the upper, middle and lower portions along two horizontal separation lines, as shown in FIG. 4B, the upper portion of the image is sent to DSP0 for encoding, and the middle portion of the image is sent to DSP1 for encoding, and the lower portion of the image is sent to DSP2 for encoding.

Step 41: DSP1 divides the first row of macro blocks of the middle portion of the received image into the identical slice and stores configuration information that filtering for horizontal boundaries is not performed on the slice, as shown in FIG. 4B.

DSP2 divides the first row of macro blocks of the lower portion of the received image into the identical slice and stores configuration information that filtering for horizontal boundaries is not performed on the slice, as shown in FIG. 4B.

In step 41, the purpose of configuring filtering for the highest horizontal boundary of the first row of macro blocks in the middle portion of the image to be unperformed will be described now. Because loop filtering for the middle portion of the image begins from the first row of macro blocks, and in the prior art, filtering for the first row of macro blocks in the middle portion of the image does not begin until loop filtering for the upper portion of the image has been completed. In the present invention, after the filtering for the highest horizontal boundary of the first row of macro blocks in the middle portion of the image is configured to be unperformed, filtering for the first row of macro blocks can begin to be performed without waiting until the loop filtering for the upper portion of the image is completed, so as to be performed concurrently with loop filtering for the upper portion of the image.

The purpose of configuring filtering for the highest horizontal boundary of the first row of macro blocks in the lower portion of the image to be unperformed will be described now. Because loop filtering for the lower portion of the image begins from the first row of macro blocks, and in the prior art, filtering for the first row of macro blocks in the lower portion of the image does not begin until loop filtering for the middle portion of the image has been completed. In the present invention, after the filtering for the highest horizontal boundary of the first row of macro blocks in the lower portion of the image is configured to be unperformed, filtering for the first row of macro blocks can begin to be performed without waiting until the loop filtering for the middle portion of the image is completed, so as to be performed concurrently with loop filtering for the middle portion of the image. Further, loop filtering for the upper, middle and lower portions of the image may be performed concurrently.

Step 42: DSP0, DSP1 and DSP2 perform encoding operations except loop filtering on the received image.

Step 43: after DSP0, DSP1 and DSP2 finish the encoding operations, they perform loop filtering on the images encoded by themselves concurrently. DSP1 does not perform filtering on the highest horizontal boundary of the first row of macro blocks in the image encoded by itself when performing loop filtering on the image. DSP2 does not perform filtering on the highest horizontal boundary of the first row of macro blocks in the image encoded by itself when performing loop filtering on the image.

There may be two cases where DSP0, DSP1 and DSP2 perform loop filtering concurrently.

In the first case, DSP0, DSP1 and DSP2 begin to perform loop filtering on their own encoded images at the same time, i.e., DSP0, DSP1 and DSP2 perform loop filtering completely concurrently.

In the second case, one of DSP0, DSP1 and DSP2 begins to perform loop filtering on the image encoded by itself before the other DSP has completed loop filtering, i.e., DSP0, DSP1 and DSP2 perform loop filtering partially concurrently.

Step 44: DSP0 exchanges filtering data with DSP1, and DSP1 exchanges filtering data with DSP2, and DSP0, DSP1 and DSP2 use the received filtering data to make a reference for the next image frame to be processed.

In this step, DSP1 sends filtering data of a set row of the loop filtered image to DSP0, for example, it sends filtering data of the first slice of the loop filtered image to DSP0; and DSP0 sends filtering data of a set row of the loop filtered image to DSP1, for example, it sends filtering data of the last slice of the loop filtered image to DSP1, furthermore, DSP1 sends filtering data of a set row of the loop filtered image to DSP2, for example, it sends filtering data of the last slice of the loop filtered image to DSP2; and DSP2 sends filtering data of a set row of the loop filtered image to DSP1, for example, it sends filtering data of the first slice of the loop filtered image to DSP1.

In sum, N DSP chips which perform loop filtering concurrently are included in the multi-core image encoding device. The $M^{th}$ DSP chip in the N DSP chips does not perform filtering on the highest horizontal boundary of the first row of macro blocks in the image encoded by this chip, i.e., the $M^{th}$ DSP chip performs loop filtering on other boundaries except the highest horizontal boundary of the first row of the macro blocks when performing loop filtering on the first row of macro blocks in the image encoded by this chip, where N is an integer greater than 1 and M is an integer greater than or equal to 2 and less than or equal to N. After loop filtering is finished, the $M^{th}$ DSP chip sends filtering data of a set row of the loop filtered image to its former adjacent DSP chip, which sends filtering data of a set row of the loop filtered image to the $M^{th}$ DSP chip. The $M^{th}$ DSP chip and its former adjacent DSP chip use the received filtering data to make a reference for the next image frame to be processed.

Figure 5A:
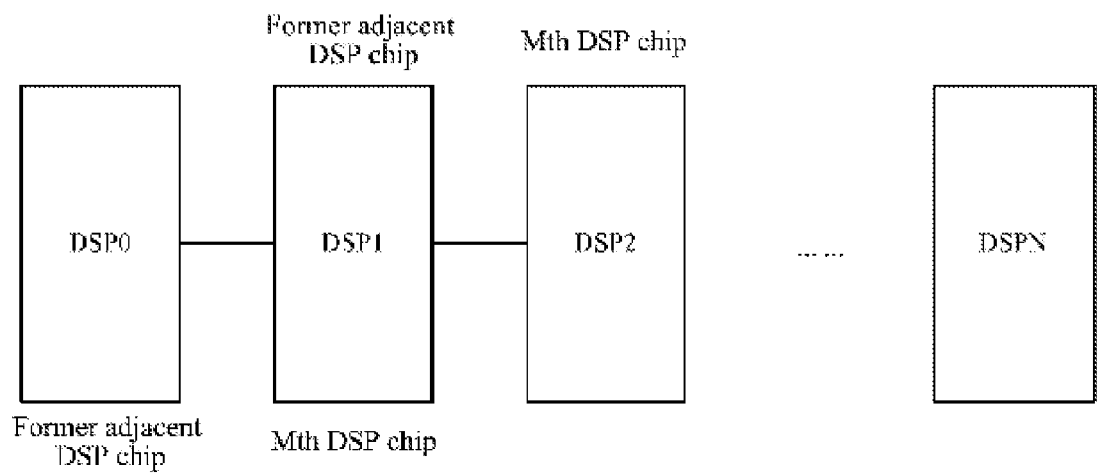
FIG. 5A is a schematic diagram of a structure of the device in accordance with the first embodiment of the present invention.

Corresponding to the method described, one embodiment of the present invention further provides a multi-core image encoding device. Referring to FIG. 5A, the device comprises N DSP chips which are configured to perform loop filtering on the images encoded by themselves concurrently.

The $M^{th}$ DSP chip in the N DSP chips is configured to perform loop filtering on other boundaries except the highest horizontal boundary of the first row of macro blocks when performing loop filtering on the first row of macro blocks in the image encoded by this chip, where N is an integer greater than 1 and M is an integer greater than or equal to 2 and less than or equal to N.

The other boundaries in this embodiment include all the horizontal boundaries and all the vertical boundaries.

There are two cases where the N DSP chips perform loop filtering on the images encoded by themselves concurrently.

In the first case, the N DSP chips begin to perform loop filtering on the images encoded by themselves at the same time.

In the second case, one of the N DSP chips begins to perform loop filtering on the image encoded by itself before the other DSP has completed loop filtering.

The $M^{th}$ DSP chip is further configured to store configuration information that filtering for the horizontal boundaries is not performed on a slice where the first row of macro blocks is located, and read the configuration information and perform loop filtering in turn on all the other horizontal boundaries except the highest horizontal boundary and all the vertical boundaries of the first row of macro blocks based on the configuration information.

The $M^{th}$ DSP chip is further configured to send filtering data of a set row of the loop filtered image to its former adjacent DSP chip and use the filtering data sent by the former adjacent DSP chip to make a reference for the next image frame to be processed.

The former adjacent DSP chip is further configured to send filtering data of a set row of the loop filtered image to the $M^{th}$ DSP chip and use the filtering data sent by the $M^{th}$ DSP chip to make a reference for the next image frame to be processed.

Figure 5B:
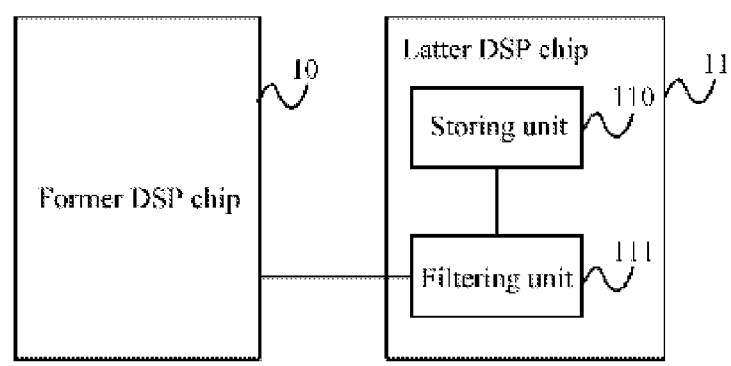
FIG. 5B is a schematic diagram of a structure of the device in accordance with the second embodiment of the present invention.

As a variation to the multi-core image encoding device in accordance with the embodiment described above, one embodiment of the present invention further provides a multi-core image encoding device. Referring to FIG. 5B, the multi-core image encoding device may comprise a former digital signal processing (DSP) chip 10 and a latter DSP chip 11, where the former DSP chip 10 and the latter DSP chip 11 are any two adjacent DSP chips.

The latter DSP chip 11 is configured to perform loop filtering on all horizontal boundaries except the highest horizontal boundary and all vertical boundaries of the first row of macro blocks in the image encoded by itself.

The latter DSP chip 11 may comprise a storing unit 110 and a filtering unit 111.

The storing unit 110 is configured to store configuration information that filtering for the horizontal boundaries is not performed on a slice where the first row of macro blocks is located.

The filtering unit 111 is configured to read the configuration information stored by the storing unit and perform loop filtering in turn on all the other horizontal boundaries except the highest horizontal boundary and all the vertical boundaries of the first row of macro blocks in the image encoded by itself based on the configuration information.

The latter DSP chip is further configured to send filtering data of a set row of the loop filtered image to the former DSP chip and use the filtering data of the set row sent by the former DSP chip to make a reference for the next image frame to be processed.

The former DSP chip is configured to send filtering data of a set row of its loop filtered image to the latter DSP chip and use the filtering data of the set row sent by the latter DSP chip to make a reference for the next image frame to be processed.

For any two adjacent DSP chips described above, because the latter one does not perform filtering on the highest horizontal boundary of the first row of macro blocks in the image when performing loop filtering for the image, such that a certain DSP chip can begin to perform loop filtering without waiting until the former DSP chip adjacent to the chip has completed loop filtering, and a plurality of DSP chips can further perform loop filtering concurrently, thereby improving effectively utilization of DSP resources in the multi-core image encoding device.

In order to improve utilization of DSP resources in a multi-core image encoding device, one embodiment of the present invention provides a method for performing image filtering by the multi-core image encoding device. In the method, N DSP chips in the multi-core image encoding device perform loop filtering on the images encoded by themselves concurrently. For any two adjacent DSP chips among the N DSP chips, the former one does not perform filtering on the highest horizontal boundary of the first row of macro blocks of the last slice in the image when performing loop filtering for the image, that is, the former DSP chip performs loop filtering on other boundaries except the highest horizontal boundary of the first row of macro blocks when performing loop filtering on the first row of macro blocks of the last slice in the image encoded by this DSP chip.

The above method will be described below in conjunction with particular embodiments.

The Third Embodiment

Figure 6A:
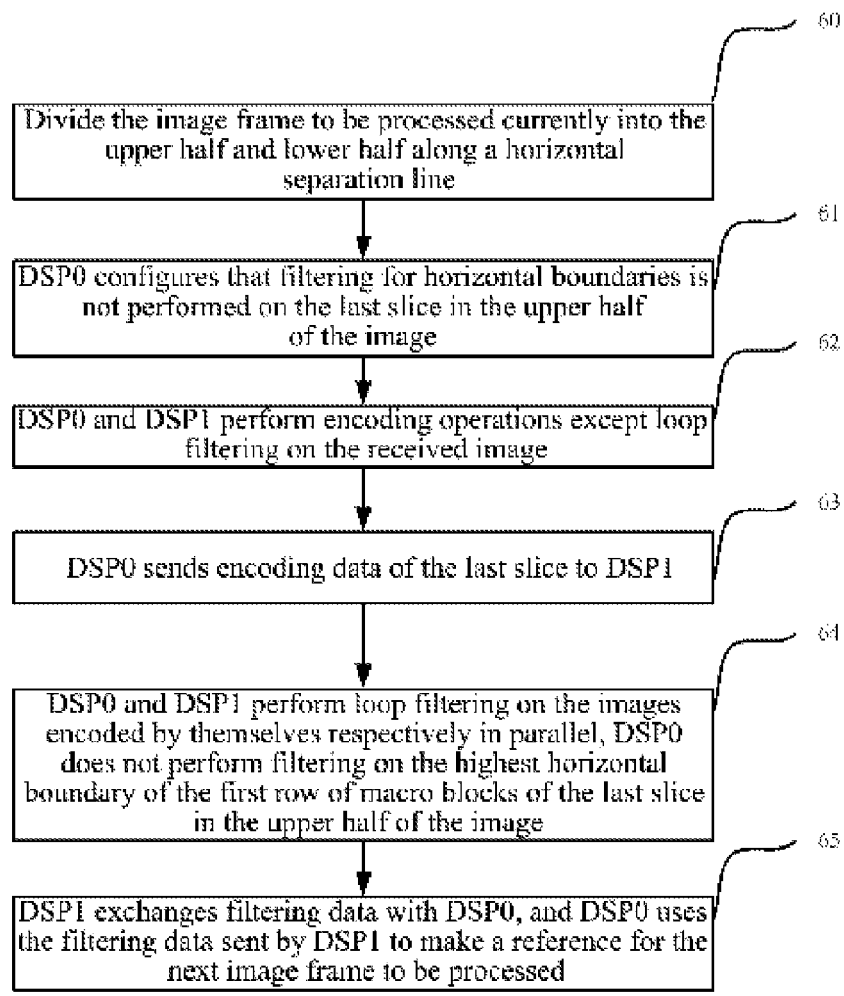
FIG. 6A is a flow chart of a method in accordance with the third embodiment of the present invention.

In this embodiment, a multi-core image encoding device comprises 2 DSP chips, DSP0 and DSP1. DSP0 processes the upper half of an image frame to be processed, and DSP1 processes the lower half of the image frame to be processed. DSP0 and DSP1 perform loop filtering for the image concurrently. As shown in FIG. 6A, a flow of specific implementation will be described below.

Figure 6B:
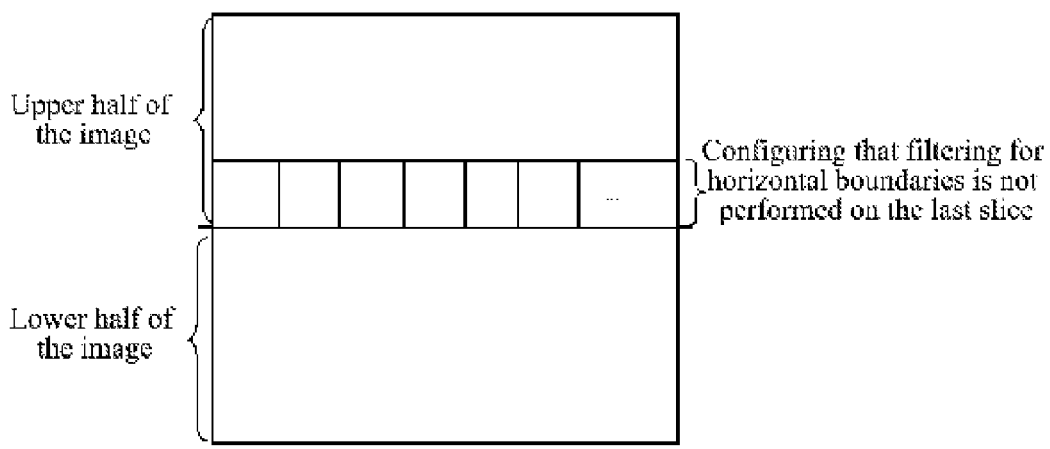
FIG. 6B is a schematic diagram of image division in accordance with the third embodiment of the present invention.

Step 60: the image frame to be processed currently is divided into the upper half and lower half along a horizontal separation line, as shown in FIG. 6B, the upper half of the image is sent to DSP0 for encoding, and the lower half of the image is sent to DSP1 for encoding.

Step 61: DSP0 configures that filtering for horizontal boundaries is not performed on the last slice in the upper half of the received image and stores the configuration information, as shown in FIG. 6B.

Step 62: DSP0 and DSP1 perform encoding operations except loop filtering, including intra-frame prediction and inter-frame prediction, DCT, quantification, entropy coding, inverse quantification, inverse DCT, on the received image.

Step 63: after DSP0 finishes the encoding operations on the last slice of the upper half of the image, it sends encoding data of the last slice to DSP1.

Step 64: after DSP0 and DSP1 finish the encoding operations, they perform loop filtering on the images encoded by themselves in parallel. DSP0 does not perform filtering on the highest horizontal boundary of the first row of macro blocks of the last slice in the images encoded by itself when performing loop filtering on the image; and DSP1 performs loop filtering on the encoding data sent by DSP0 and the encoding data encoded by itself.

In this step, DSP0 may perform filtering on the first row of macro blocks of the last slice in the image by reading the configuration information stored in the step 61 and performing loop filtering in turn on all the other horizontal boundaries except the highest horizontal boundary and all the vertical boundaries of the first row of macro blocks based on the configuration information. As shown in FIG. 1, the order of filtering for the boundaries of the first row of macro blocks is a, b, c, d, f, g, h.

There may be two cases where DSP0 and DSP1 perform loop filtering concurrently.

In the first case, DSP0 and DSP1 begin to perform loop filtering on the images encoded by themselves in parallel at the same time, i.e., DSP0 and DSP1 perform loop filtering completely concurrently.

In the second case, one of DSP0 and DSP1 begins to perform loop filtering on the image encoded by itself before the other DSP has completed loop filtering, i.e., DSP0 and DSP1 perform loop filtering partially concurrently.

DSP0 and DSP1 performing loop filtering concurrently saves the time for DSP1 to wait for loop filtering by DSP0, thereby greatly improving encoding efficiency of the processor.

Step 65: DSP1 exchanges filtering data with DSP0, and DSP0 uses the filtering data sent by DSP1 to make a reference for the next image frame to be processed.

In this step, DSP1 sends filtering data of a set row of the loop filtered image to DSP0, for example, it sends filtering data of the first slice of the loop filtered image to DSP0.

The Fourth Embodiment

Figure 7A:
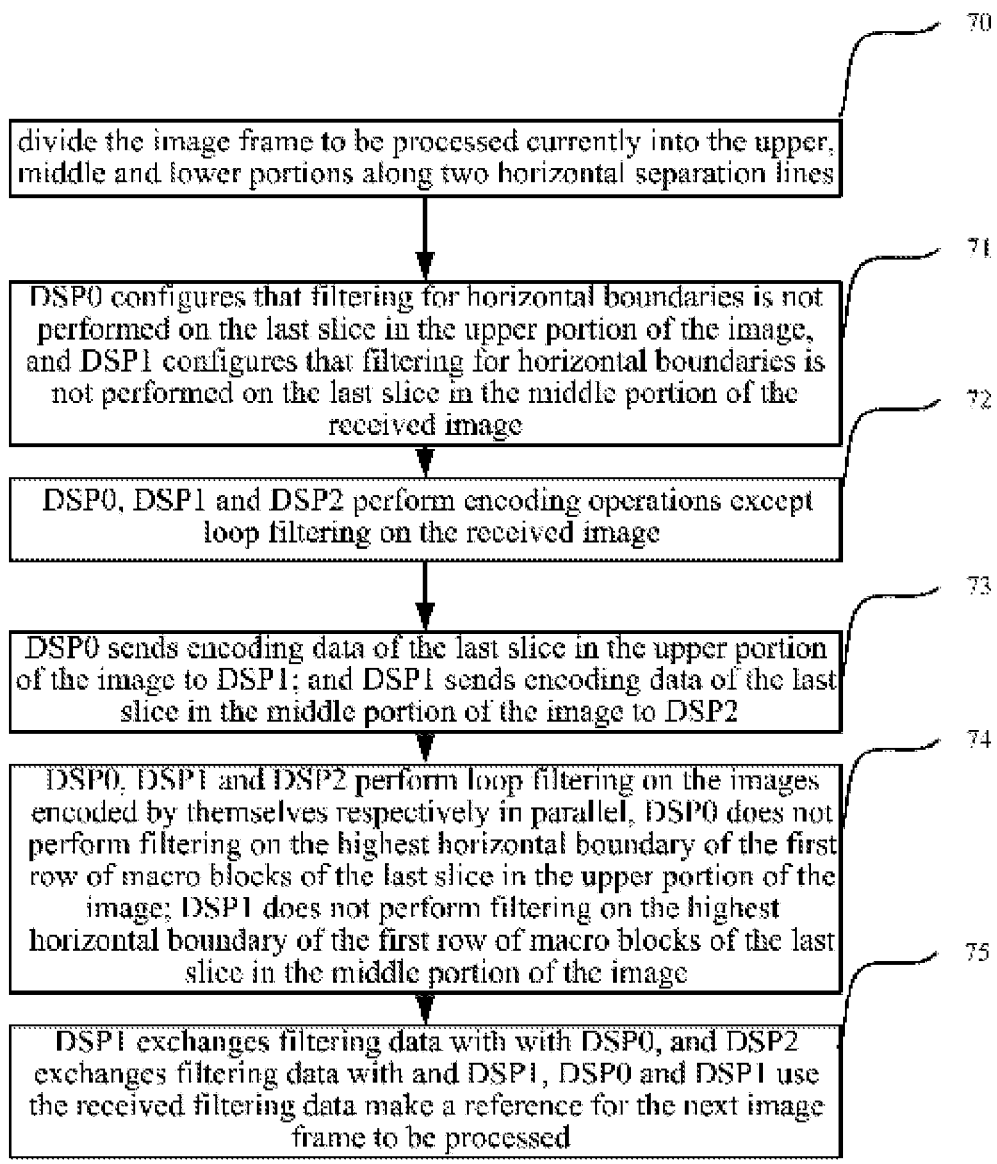
FIG. 7A is a flow chart of a method in accordance with the fourth embodiment of the present invention.

In this embodiment, a multi-core image encoding device comprises 3 DSP chips, DSP0, DSP1 and DSP2. DSP0 processes the upper portion of an image frame to be processed, DSP1 processes the middle portion of the image frame to be processed, and DSP2 processes the lower portion of the image frame to be processed. DSP0, DSP1 and DSP2 perform loop filtering for the image concurrently. As shown in FIG. 7A, a flow of specific implementation will be described below.

Figure 7B:
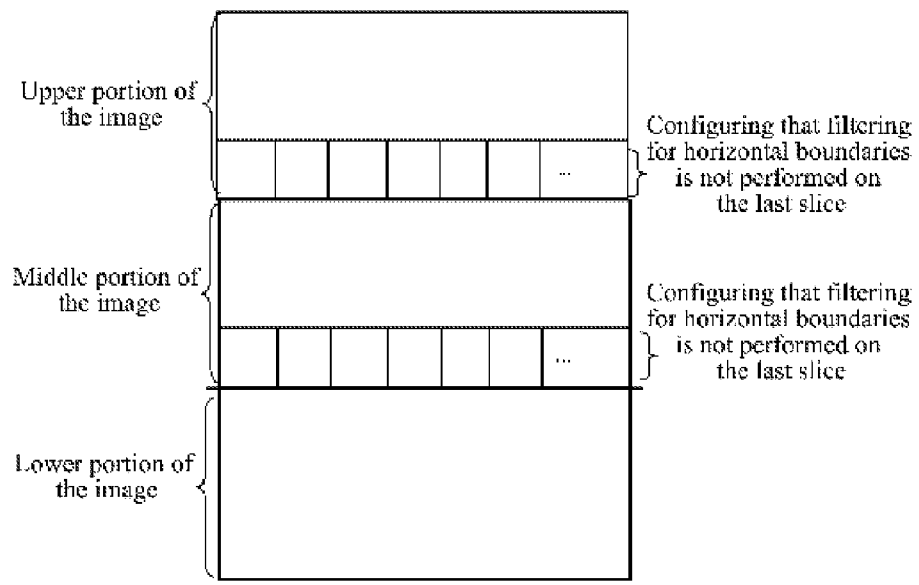
FIG. 7B is a schematic diagram of image division in accordance with the fourth embodiment of the present invention.

Step 70: the image frame to be processed currently is divided into the upper, middle and lower portions along two horizontal separation lines, as shown in FIG. 7B, the upper portion of the image is sent to DSP0 for encoding, and the middle portion of the image is sent to DSP1 for encoding, and the lower portion of the image is sent to DSP2 for encoding.

Step 71: DSP0 configures that filtering for horizontal boundaries is not performed on the last slice in the upper portion of the received image and stores the configuration information, and DSP1 configures that filtering for horizontal boundaries is not performed on the last slice in the middle portion of the received image and stores the configuration information, as shown in FIG. 7B.

Step 72: DSP0, DSP1 and DSP2 perform encoding operations except loop filtering, including intra-frame prediction and inter-frame prediction, DCT, quantification, entropy coding, inverse quantification, inverse DCT, on the received image.

Step 73: after DSP0 finishes the encoding operations on the last slice of the upper portion of the image, it sends encoding data of the last slice to DSP1; and after DSP1 finishes the encoding operations on the last slice of the middle portion of the image, it sends encoding data of the last slice to DSP2.

Step 74: after DSP0, DSP1 and DSP2 finish the encoding operations, they perform loop filtering on the images encoded by themselves in parallel. DSP0 does not perform filtering on the highest horizontal boundary of the first row of macro blocks of the last slice in the image encoded by itself when performing loop filtering on the image; DSP1 does not perform filtering on the highest horizontal boundary of the first row of macro blocks of the last slice in the image encoded by itself when performing loop filtering on the encoding data sent by DSP0 and the image; and DSP2 performs loop filtering on the encoding data sent by DSP1 and the encoding data encoded by itself.

There may be two cases where DSP0, DSP1 and DSP2 perform loop filtering concurrently.

In the first case, DSP0, DSP1 and DSP2 begin to perform loop filtering on their own encoded images at the same time, i.e., DSP0, DSP1 and DSP2 perform loop filtering completely concurrently.

In the second case, one of DSP0, DSP1 and DSP2 begins to perform loop filtering on the image encoded by itself before another DSP has completed loop filtering, i.e., DSP0, DSP1 and DSP2 perform loop filtering partially concurrently.

Step 75: DSP1 exchanges filtering data with DSP0, and DSP2 exchanges filtering data with DSP1, DSP0 uses the filtering data sent by DSP1 to make a reference for the next image frame to be processed, and DSP1 uses the filtering data sent by DSP2 to make a reference for the next image frame to be processed.

In this step, DSP1 sends filtering data of a set row of the loop filtered image to DSP0, for example, it sends filtering data of the first slice of the loop filtered image to DSP0. DSP2 sends filtering data of a set row of the loop filtered image to DSP1, for example, it sends filtering data of the first slice of the loop filtered image to DSP0.

In sum, N DSP chips which perform loop filtering concurrently are included in the multi-core image encoding device. The $M^{th}$ DSP chip in the N DSP chips does not perform filtering on the highest horizontal boundary of the first row of macro blocks of the last slice in the image encoded by this chip, i.e., the $M^{th}$ DSP chip performs loop filtering on other boundaries except the highest horizontal boundary of the first row of the macro blocks when performing loop filtering on the first row of macro blocks of the last slice in the image encoded by this chip. The $M^{th}$ DSP chip further needs to send encoding data of the last slice in its own processed image to its latter adjacent DSP chip, which performs loop filtering on the encoding data sent by the $M^{th}$ DSP chip and the encoding data encoded by this chip, where N is an integer greater than 1 and M is an integer greater than or equal to 1 and less than or equal to N. After loop filtering is finished, the latter adjacent DSP chip sends filtering data of a set row of the loop filtered image to the $M^{th}$ DSP chip, which uses the received filtering data to make a reference to the next image frame to be processed.

Figure 8A:
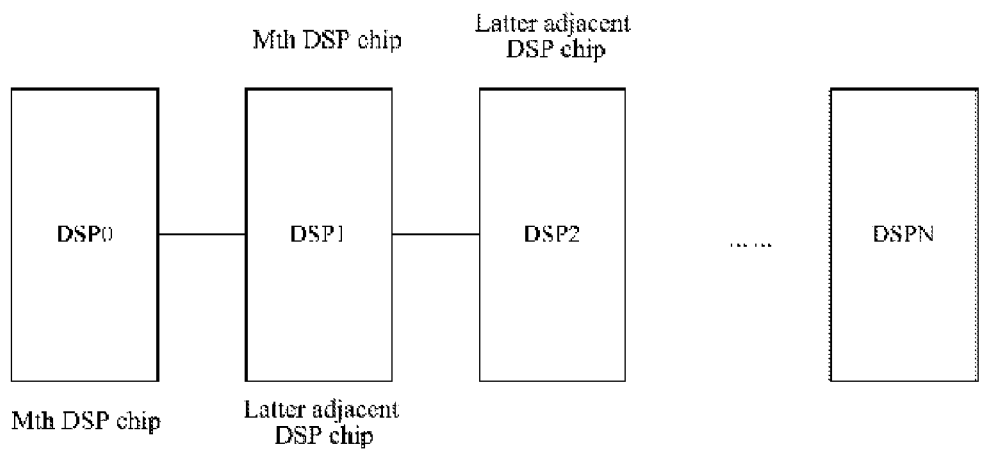
FIG. 8A is a schematic diagram of a structure of the device in accordance with the third embodiment of the present invention.

Corresponding to the method described, one embodiment of the present invention further provides a multi-core image encoding device. Referring to FIG. 8A, the device comprises N DSP chips.

The N DSP chips are configured to perform loop filtering on their own encoded images concurrently.

The $M^{th}$ DSP chip in the N DSP chips is configured to send encoding data of the last slice to its latter adjacent DSP chip after finishing encoding operations on the last slice in its own processed image, and perform loop filtering on other boundaries except the highest horizontal boundary of the first row of the macro blocks when performing loop filtering on the first row of macro blocks of the last slice in the image encoded by this chip.

The latter adjacent DSP chip is configured to perform loop filtering on the encoding data sent and the encoding data encoded by this chip, where N is an integer greater than 1 and M is an integer greater than or equal to 1 and less than or equal to N.

There are two cases where the N DSP chips perform loop filtering on the images encoded by themselves concurrently.

In the first case, the N DSP chips begin to perform loop filtering on the images encoded by themselves at the same time.

In the second case, one of the N DSP chips begins to perform loop filtering on the image encoded by itself before the other DSP has completed loop filtering.

The $M^{th}$ DSP chip is further configured to store configuration information that filtering for the horizontal boundaries is not performed on a slice where the first row of macro blocks is located, and read the configuration information and perform loop filtering in turn on all the other horizontal boundaries except the highest horizontal boundary and all the vertical boundaries of the first row of macro blocks based on the configuration information.

The latter adjacent DSP chip is further configured to send filtering data of a set row of the loop filtered image to the $M^{th}$ DSP chip.

The $M^{th}$ DSP chip is further configured to use the received filtering data to make a reference for the next image frame to be processed.

The other boundaries in this embodiment include all the horizontal boundaries and all the vertical boundaries.

Figure 8B:
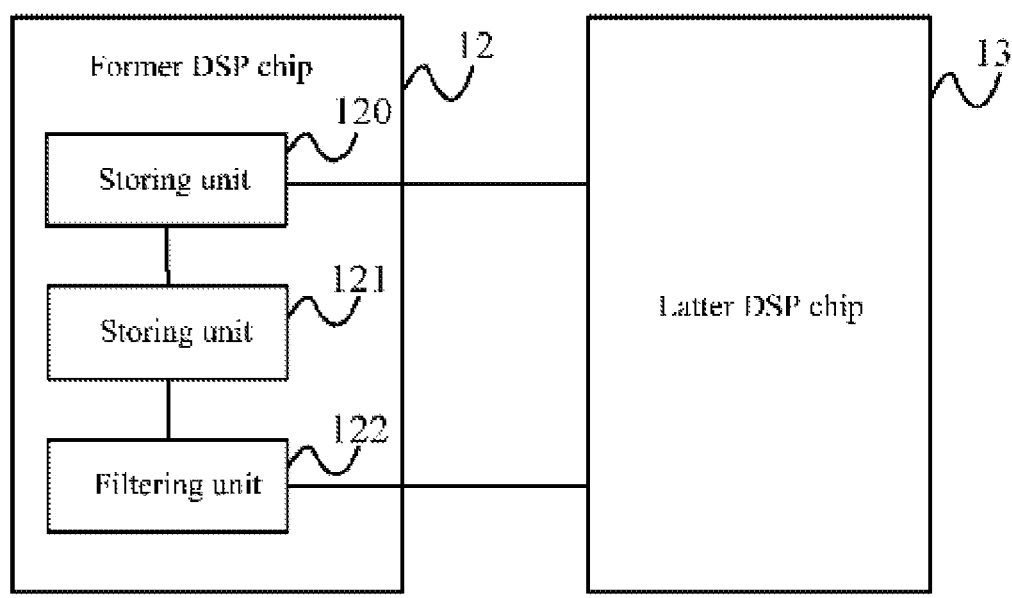
FIG. 8B is a schematic diagram of a structure of the device in accordance with the fourth embodiment of the present invention.

As a variation to the multi-core image encoding device in accordance with the embodiment described above, one embodiment of the present invention further provides a multi-core image encoding device. Referring to FIG. 8B, the multi-core image encoding device may comprise a latter digital signal processing (DSP) chip 13 and a former DSP chip 12, where the latter DSP chip 13 and the former DSP chip 12 are any two adjacent DSP chips.

The former DSP chip 12 is configured to perform loop filtering on all horizontal boundaries except the highest horizontal boundary and all vertical boundaries of the first row of macro blocks of the last slice in the image encoded by itself.

The former DSP chip 12 may comprise an encoding unit 120 configured to complete encoding operation on the last slice in its corresponding processed image and send encoding data of the last slice to the latter DSP chip.

The latter DSP chip 13 is configured to perform loop filtering on the encoding data received from the encoding unit and the encoding data encoded by itself.

The former DSP chip may further comprise a storing unit 121 and a reading unit 122.

The storing unit 121 is configured to store configuration information that filtering for the horizontal boundaries is not performed on a slice where the first row of macro blocks is located after the encoding unit 120 completes the encoding operation.

The reading unit 122 is configured to read the configuration information and perform loop filtering in turn on all the other horizontal boundaries except the highest horizontal boundary and all the vertical boundaries of the first row of macro blocks based on the configuration information.

The latter DSP chip is further configured to send filtering data of the first slice of the loop filtered image to the former DSP chip.

The former DSP chip is further configured to use the received filtering data to make a reference for the next image frame to be processed.

For any two adjacent DSP chips described above, because the former one does not perform filtering on the highest horizontal boundary of the first row of macro blocks of the last slice in the image when performing loop filtering for the image such that a certain DSP chip can begin to perform loop filtering without waiting until the former DSP chip adjacent to the chip has completed loop filtering, and a plurality of DSP chips can further perform loop filtering concurrently, thereby improving effectively utilization of DSP resources in the multi-core image encoding device.

In sum, the beneficial effects of the present invention will be described below.

In the scheme provided in the embodiments of the present invention, N DSP chips in the multi-core image encoding device perform loop filtering on the images encoded by themselves concurrently. Moreover, for any two adjacent DSP chips among the N DSP chips, the latter one does not perform filtering on the highest horizontal boundary of the first row of macro blocks in the image when performing loop filtering for the image, or, the former DSP chip does not perform loop filtering on the highest horizontal boundary of the first row of macro blocks of the last slice in the image when performing loop filtering for the image, such that a certain DSP chip can begin to perform loop filtering without waiting until the former DSP chip adjacent to the chip has completed loop filtering, and a plurality of DSP chips can further perform loop filtering concurrently, thereby improving effectively utilization of DSP resources in the multi-core image encoding device.

Obviously, various modifications and variations may be made to the present invention by those skilled in the art without departing from the spirit and scope of the present invention. Thus, it is intended that the present invention includes these modifications and variations if they belong to the scope of the claims of the present invention and its equivalent technique.

INDUSTRIAL APPLICABILITY

In the method for performing image filtering by the multi-core image encoding device in accordance with the present invention, for any two adjacent DSP chips, the latter one does not perform filtering on the highest horizontal boundary of the first row of macro blocks in the image when performing loop filtering for the image, or, the former DSP chip does not perform loop filtering on the highest horizontal boundary of the first row of macro blocks of the last slice in the image when performing loop filtering for the image, such that a certain DSP chip can begin to perform loop filtering without waiting until the former DSP chip adjacent to the chip has completed loop filtering, and a plurality of DSP chips can further perform loop filtering concurrently, thereby improving effectively utilization of DSP resources in the multi-core image encoding device.

What is claimed is:

1. A method for performing image filtering by a multi-core image encoding device, comprising following steps of:
   a first digital signal processing (DSP) chip performing loop filtering on an image encoded by itself; and
   a latter DSP chip in any two adjacent DSP chips performing loop filtering on all horizontal boundaries except a highest horizontal boundary and all vertical boundaries of a first row of macro blocks in the image encoded by itself.

2. The method according to claim 1, wherein before the step of the latter DSP chip performing loop filtering on the first row of macro blocks in the image encoded by itself, the method further comprises:

dividing the first row of macro blocks in one slice and storing configuration information that loop filtering for the horizontal boundaries is not performed on the slice;

the step of performing loop filtering on all horizontal boundaries except the highest horizontal boundary and all vertical boundaries of the first row of macro blocks comprises:

reading the configuration information and performing loop filtering in turn on all the horizontal boundaries except the highest horizontal boundary and all the vertical boundaries of the first row of macro blocks based on the configuration information.

3. The method according to claim 1, wherein the step of any two adjacent DSP chips performing loop filtering on the images encoded by themselves comprises:

the two adjacent DSP chips performing loop filtering on the images encoded by themselves respectively at the same time; or one of the two adjacent DSP chips beginning to perform loop filtering on the image encoded by itself before the other DSP chip has completed loop filtering.

4. The method according to claim 1, wherein after the step of any two adjacent DSP chips performing loop filtering on the images encoded by themselves, the method further comprises:

the latter DSP chip sending filtering data of a set row of the image which has been loop filtered by the latter DSP chip itself to a former DSP chip adjacent to the latter DSP chip;

the former DSP chip sending filtering data of a set row of the image which has been loop filtered by the former DSP chip itself to the latter DSP chip; and the latter DSP chip and the former DSP chip using the received filtering data of the set row respectively to make a reference for a next image frame to be processed.

5. A method for performing image filtering, comprising following steps of:

a former DSP chip in any two adjacent DSP chips performing loop filtering on all horizontal boundaries except a highest horizontal boundary and all vertical boundaries of a first row of macro blocks of a last slice in an image encoded by itself; and a last DSP chip performing loop filtering on an image encoded by itself.

6. The method according to claim 5, wherein before the step of any two adjacent DSP chips performing loop filtering on the images encoded by themselves respectively, the method further comprises:

the former DSP chip completing encoding operation on the last slice in a corresponding image processed by itself and sending encoding data of the last slice to a latter DSP chip adjacent to the former DSP chip;

the step of any two adjacent DSP chips performing loop filtering on the images encoded by themselves respectively comprises:

the latter DSP chip performing loop filtering on the encoding data received from the former DSP chip and the encoding data encoded by itself.

7. The method according to claim 5, wherein, before the step of the former DSP chip performing loop filtering on the first row of macro blocks of the last slice in the image encoded by itself, the method further comprises:

storing configuration information that loop filtering for the horizontal boundaries is not performed on the last slice;

the step of performing loop filtering on all horizontal boundaries except the highest horizontal boundary and all vertical boundaries of the first row of macro blocks comprises:

reading the configuration information and performing loop filtering in turn on all the horizontal boundaries except the highest horizontal boundary and all the vertical boundaries of the first row of macro blocks based on the configuration information.

8. The method according to claim 5, wherein the step of any two adjacent DSP chips performing loop filtering on the images encoded by themselves respectively comprises:

the two adjacent DSP chips performing loop filtering on the images encoded by themselves respectively at the same time; or one of the two adjacent DSP chips beginning to perform loop filtering on the image encoded by itself before the other DSP has completed loop filtering.

9. The method according to claim 5, wherein after the step of any two adjacent DSP chips performing loop filtering on the images encoded by themselves respectively, the method further comprises:

the latter DSP chip adjacent to the former DSP chip sending filtering data of a first slice of the image loop filtered by itself to the former DSP chip; and the former DSP chip using received filtering data to make a reference for a next image frame to be processed.

10. A multi-core image encoding device comprising a former digital signal processing (DSP) chip and a latter DSP chip, the former DSP chip and the latter DSP chip being any two adjacent DSP chips;

the latter DSP chip is configured to perform loop filtering on all horizontal boundaries except a highest horizontal boundary and all vertical boundaries of a first row of macro blocks in an image encoded by the latter DSP chip itself.

11. The device according to claim 10, wherein the latter DSP chip comprises:

a storing unit configured to store configuration information that filtering for the horizontal boundaries is not performed on a slice where the first row of macro blocks are located; and a filtering unit configured to read the configuration information stored by the storing unit and perform loop filtering in turn on all the horizontal boundaries except the highest horizontal boundary and all vertical boundaries of the first row of macro blocks in the image encoded by the latter DSP chip itself based on the configuration information.

12. The device according to claim 10, wherein the latter DSP chip is further configured to:

send filtering data of a set row of the loop filtered image to the former DSP chip; and use the filtering data of the set row sent by the former DSP chip to make a reference for a next image frame to be processed;

the former DSP chip is configured to send filtering data of a set row of the image which has been loop filtered by itself to the latter DSP chip; and use the filtering data of the set row sent by the latter DSP chip to make a reference for a next image frame to be processed.

13. A multi-core image encoding device, comprising a latter digital signal processing (DSP) chip and a former DSP chip, the latter DSP chip and the former DSP chip being any two adjacent DSP chips, the former DSP chip is configured to perform loop filtering on all horizontal boundaries except a highest horizontal boundary and all vertical boundaries of a first row of macro blocks of a last slice in an image encoded by itself.

14. The device according to claim 13, wherein the former DSP chip comprises:

an encoding unit configured to complete encoding operation on the last slice in a corresponding image processed by itself and send encoding data of the last slice to the latter DSP chip;

wherein the latter DSP chip is configured to perform loop filtering on the encoding data received from the encoding unit and the encoding data encoded by itself.

15. The device according to claim 13, wherein the former DSP chip further comprises:

a storing unit configured to store configuration information that filtering for the horizontal boundaries is not performed on a slice where the first row of macro blocks is located after the encoding unit has completed the encoding operation; and a reading unit configured to read the configuration information and perform loop filtering in turn on all the horizontal boundaries except the highest horizontal boundary and all vertical boundaries of the first row of macro blocks based on the configuration information.

16. The device according to claim 13, wherein the latter DSP chip is further configured to send filtering data of a first slice of the loop filtered image to the former DSP chip;

the former DSP chip is further configured to use received filtering data to make a reference for a next image frame to be processed.

* * * * *